United States Patent [19]

Di Matteo et al.

[11] Patent Number: 4,488,173

[45] Date of Patent: Dec. 11, 1984

[54] METHOD OF SENSING THE POSITION AND ORIENTATION OF ELEMENTS IN SPACE

[75] Inventors: Paul Di Matteo, Huntington; Paul Rademacher, Glen Head; Howard Stern, Greenlawn, all of N.Y.

[73] Assignee: Robotic Vision Systems, Inc., Hauppauge, N.Y.

[21] Appl. No.: 463,971

[22] Filed: Feb. 4, 1983

Related U.S. Application Data

[63] Continuation-in-part of Ser. No. 294,341, Aug. 19, 1981, Pat. No. 4,396,945.

[51] Int. Cl.³ .................. H04N 7/18; G01B 11/00
[52] U.S. Cl. ................................. 358/107; 358/903; 364/559
[58] Field of Search .......................... 358/93, 107, 903; 364/559

[56] References Cited

U.S. PATENT DOCUMENTS 3,793,481 2/1974 Ripley .................... 358/107
4,396,945 8/1983 Di Matteo ............... 358/107

Primary Examiner—Howard W. Britton
Attorney, Agent, or Firm—Max Fogiel

[57] ABSTRACT

The invention discloses a method of determining the position and orientation of an element (such as a platform) in space by determining the intersection of a line with a plane (or with another line). Three different implementations are disclosed.

5 Claims, 11 Drawing Figures

METHOD OF SENSING THE POSITION AND ORIENTATION OF ELEMENTS IN SPACE

BACKGROUND OF THE INVENTION

This is a continuation-in-part of the copending application Ser. No. 294,341 filed Aug. 19, 1981, now U.S. Pat. No. 4,396,945.

The present invention relates to systems by which the location and orientation of an element in space (e.g. a robot arm or other platform) can be accurately determined by electro-optical means. The invention has applications either in open loop position locating systems or in closed loop position control systems such as may be used for the accurate control of robotic arms.

One of the more difficult current technological problems is to locate and orient a robotic arm with an accuracy sufficient to perform the tasks required. Such tasks might include the accurate drilling of holes, matching of surfaces or insertion of parts in predetermined positions. Many of these tasks require positioning accuracies greater than those presently achievable by the open-loop servo-mechanism controls presently employed. Most of the prior-art inaccuracies are traceable to the effects of the gravitational force vector on the robot arm, which acts to offset the arm position from that designated by the servo-mechanism controls.

SUMMARY OF THE INVENTION

It is therefore an object of the present invention to overcome the problems which are experienced by the prior art.

A more particular problem is to provide an improved method of sensing the position and orientation of an element (such as a robot arm) in space.

Still more particularly, it is an object of the invention to provide an improved method which permits sensing of the true position of an element in space, via an optical measuring system independent of gravitational effects, and to use the thus obtained information in (known per se) feedback control systems to effect positional changes that may be required to bring the element to the desired position.

The position of a point is uniquely determined by the intersection of a known line with a known plane which does not include the line. The orientation of any three-dimensional body in space is uniquely determined by the relative position of three known non-colinear points on that body. Thus, if the absolute position in space of three such non-colinear points affixed to a three-dimensional body (such as a robot arm) can be determined, then both the position and orientation of that body in space will also have been determined. According to the invention, the absolute point positions are determined by sensing that each lies simultaneously on a line and on a plane, the intersection of which is the point in question. Both the lines and planes are implemented by either projected light patterns or direction sensing capabilities of television cameras.

The invention will hereafter be described with reference to exemplary embodiments which are illustrated in the appended drawings. However, it is to be understood that this is by way of explanation only, and that no limitation is intended to the specifics of these embodiments.

BRIEF DESCRIPTION OF THE DRAWING

FIG. 8 is similar to FIG. 7, but the use of color is provided for;

DESCRIPTION OF PREFERRED EMBODIMENTS

Figures 1, 1A:
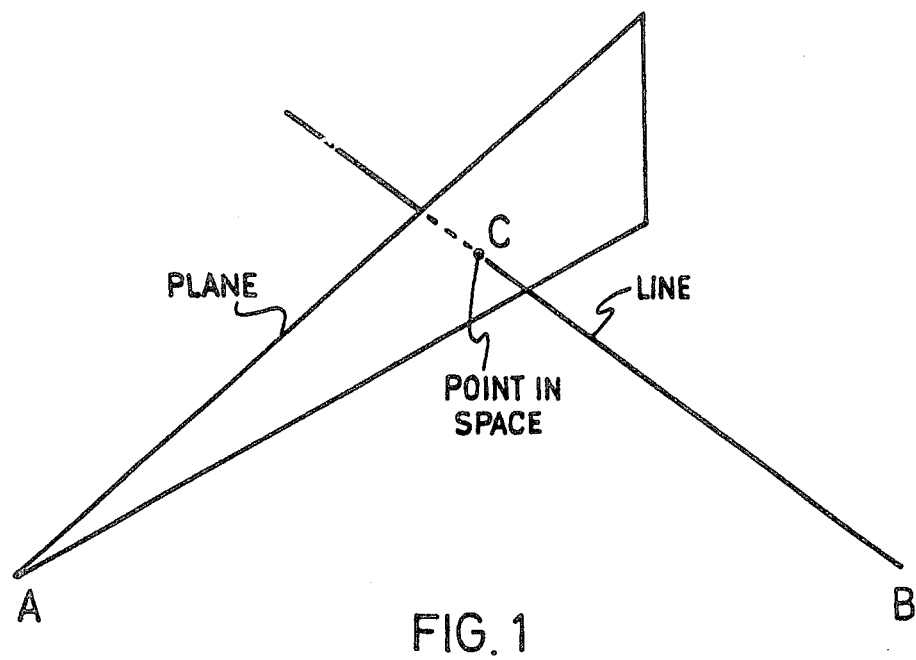
FIG. 1 is a geometric representation showing how a single point can be located in space.
FIG. 1A is a matrix illustration, showing the roles of different components employable in the system of FIG. 1.

FIGS. 1 and 1A will serve to provide a simple geometric description for locating a single point in space (the term "space" should be understood to refer to terrestrial as well as extraterrestrial space).

The source of light required to make the system operative can be resident either in the plane and/or line, or in the intersecting point itself. The possible roles of these three components of the system are described by the matrix in FIG. 1A. For the particular implementation where the point C is the light source and both A and B are cameras, C is determined to lie on the intersection of two lines in space (rather than a line and a plane). This added dimension is redundant to the solution of the problem. Extending the configuration of FIG. 1 to three points in space requires only the means of handling multiple lines/planes emanating from the camera/projectors and means of properly corresponding particular lines and planes to particular points.

Descriptions of the implementations and operations of the various configurations is included with reference to the embodiments in FIGS. 2-5.

Figure 2:
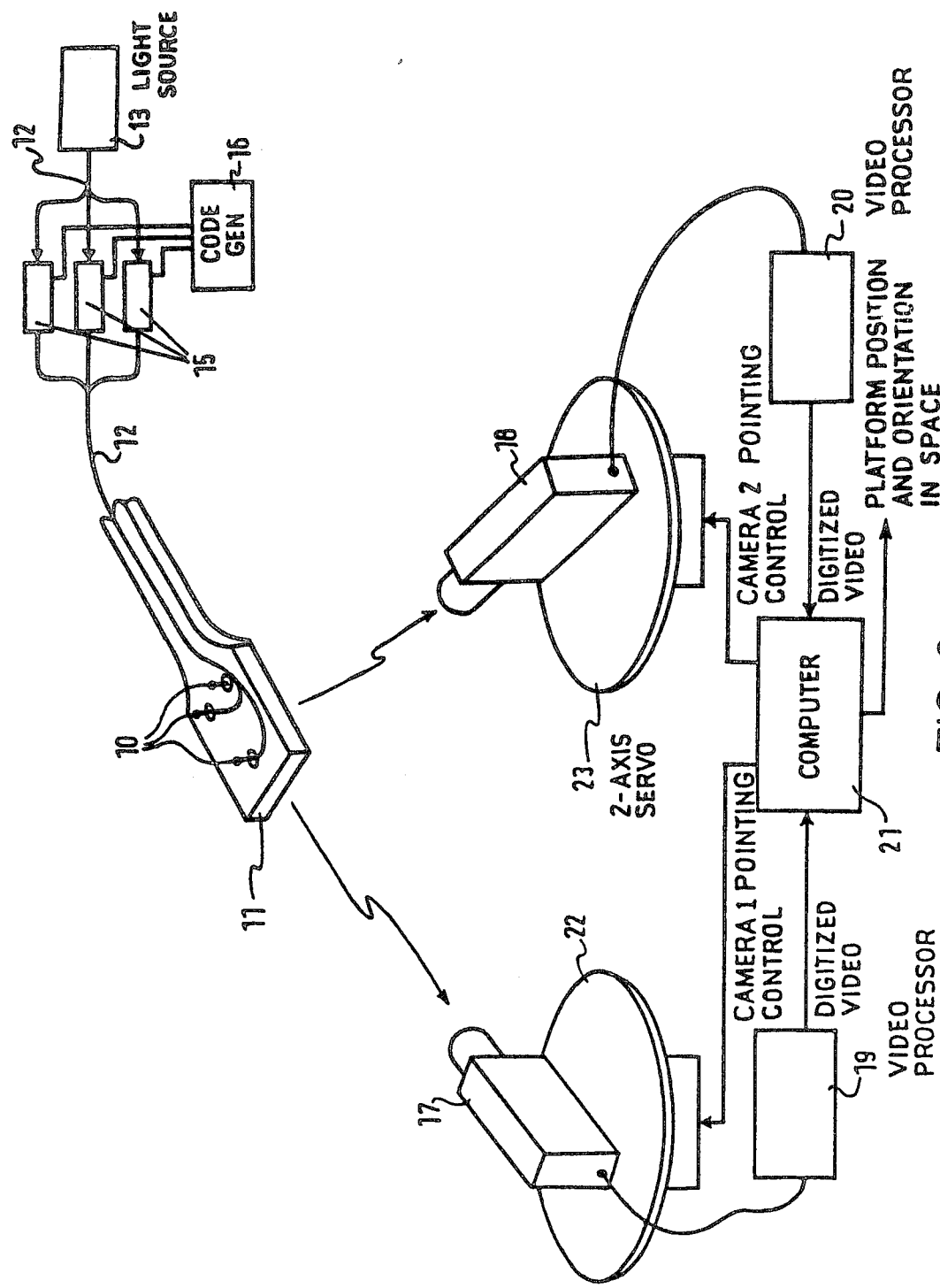
FIG. 2 is a diagrammatic illustration of a first embodiment of the invention.

FIG. 2 shows an embodiment in which the light sources are located on the platform and cameras are located at positions off the platform. Three non-colinear sources 10 are shown mounted to the platform 11. A point light source is approximated for each source 10 by grinding a spherical surface onto the end of a respective one of three thin fibre optic bundles 12. The latter serves to carry the light from the light generating source 13 which can be located conveniently elsewhere on the platform. The light generating source 13 can be either a laser or a white light source. A means of providing a unique identity for each of three light sources 10 is implemented by the three light modulators 15 shown between the light generating source 13 and the fibre optic bundles 12. Each of these modulators 15 is driven by a unique code generated by the encoder or code generator 16 which imparts an on-off modulation to each light source 10.

Two TV-type cameras 17 and 18 are located off-platform and are so situated that the three light points from sources 10 on the platform 11 are visible to both cameras 17, 18. The camera 17 to platform 11 to camera 18 angle should be nominally 90° and never less than 30° or greater than 150°. Angles outside this range will cause severe geometric distortion of precision. Each camera 17, 18 senses the images of three light sources 10. The image position on the TV field uniquely determines each source 10 to be along a specific line in space. The identity of the particular source 10 is determined by sensing and identifying the coded on-off light modulation associated with each source 10. The decoding process is done in the video processor 19, 20 associated with each TV camera 17, 18. The output of each video processor 19 or 20 is digital data describing the identity of each light source 10 and its angular direction with respect to the center of the TV field of view. These signals enter the computer 21 (known per se) which performs all position calculations and provides camera pointing control.

The pointing angle of each camera 17, 18 is servo-controlled to center the TV field of view about the platform 11. Thus the TV optical magnification can be maximized, consistent with keeping all three light sources 10 within the field of view. The high optical magnification optimizes the angle determining precision of the system. The respective 2-axis TV pointing servo 22, 23 is controlled from the computer 21 which has calculated platform position within the field of view. The servos 22, 23 are thus controlled to keep the three sources 10 centered within the field of view.

Data resident in the computer 2 on a real time basis includes the camera pointing angles (field of view centers) and the angular positions of each light source 10 with respect to these field of view centers. Thus each light source 10 is determined to be on a unique line in space emanating from each camera 17, 18. The computer 21 calculates the interaction of these lines which determines the position of each light source 10 in space. Knowing the fixed mechanical position of the light sources 10 with respect to the platform 11 is then sufficient to enable the computer 21 to calculate and output the platform position and orientation in space.

Figure 3:
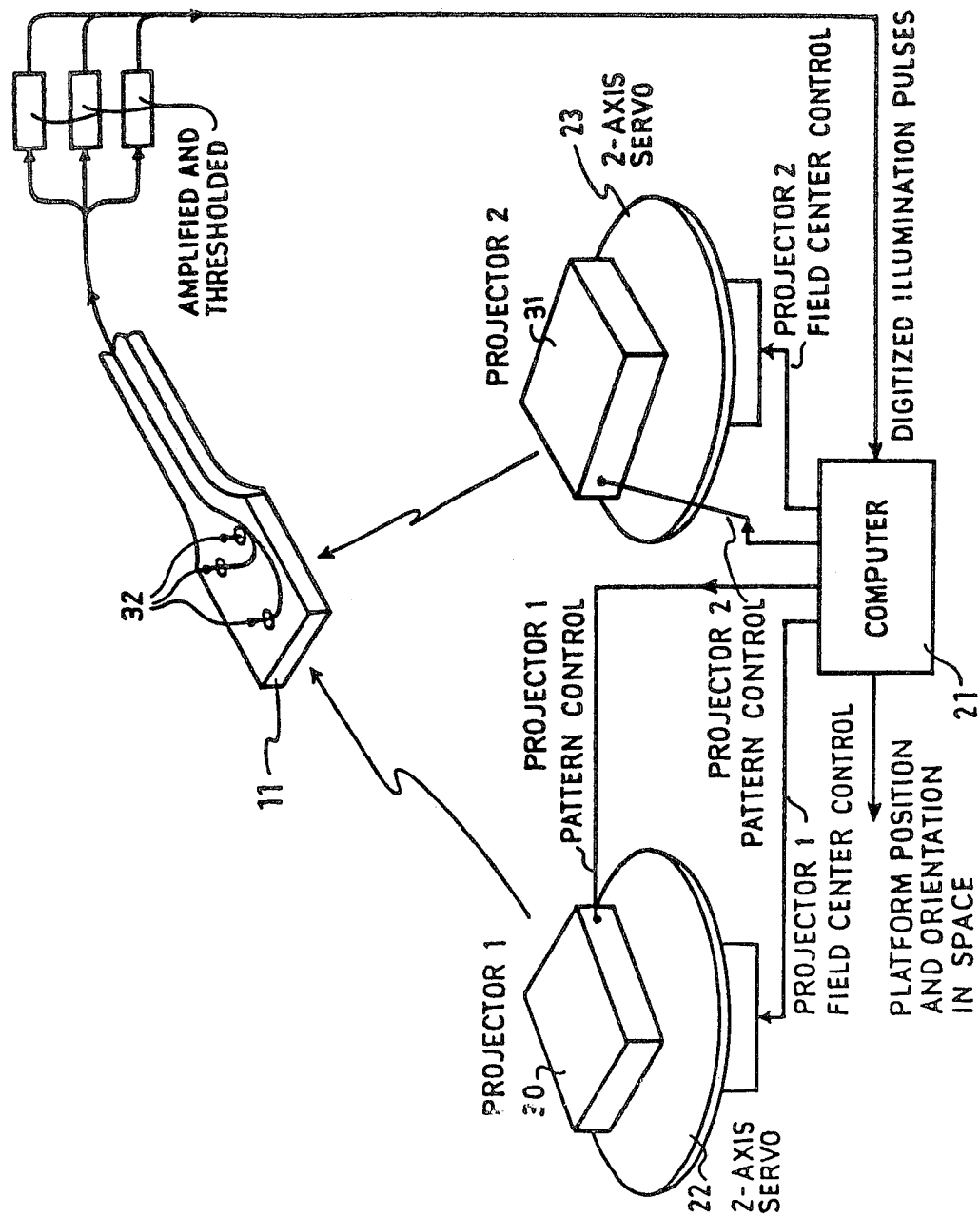
FIG. 3 is a view analogous to FIG. 2, but showing another embodiment.

FIG. 3 shows an embodiment in which light sensors are located on the platform and projectors at positions off the platform. The cameras of FIG. 2 are here replaced by light projectors 30, 31 and the light sources by light sensors 32. These may be small "chips" which convert the projected light from projectors 30, 31 impinging on them to electrical signals. These are amplified and thresholded to provide digital signals to the computer 21, indicative of the presence or absence of projected light on the sensors 32. Thus, the computer 21 knows the instance in time when each sensor 32 is illuminated.

The projectors 30, 31 generate light beams in space whose angular position is appropriately modulated with time by commands from the computer 21. By correlating the detected time of sensor illumination with the projected beam position at that time, the computer 21 can thus determine the angular position of each sensor 32 with respect to each projector 30, 31. The angular position of the optical axis of each projector 30, 31 is servo-controlled by commands from computer 21 to keep it centered on the platform. This optimizes the resolution and accuracy of the projected light patterns by minimizing the angular coverage required to illuminate all three light sensors 32. From FIG. 1 it is clear that one of the projectors 30, 31 need only project a plane in space while the other must project a line. Both the plane and line must be scanned in time so that each sensor 32 is illuminated somewhere during the scan.

Figure 4:
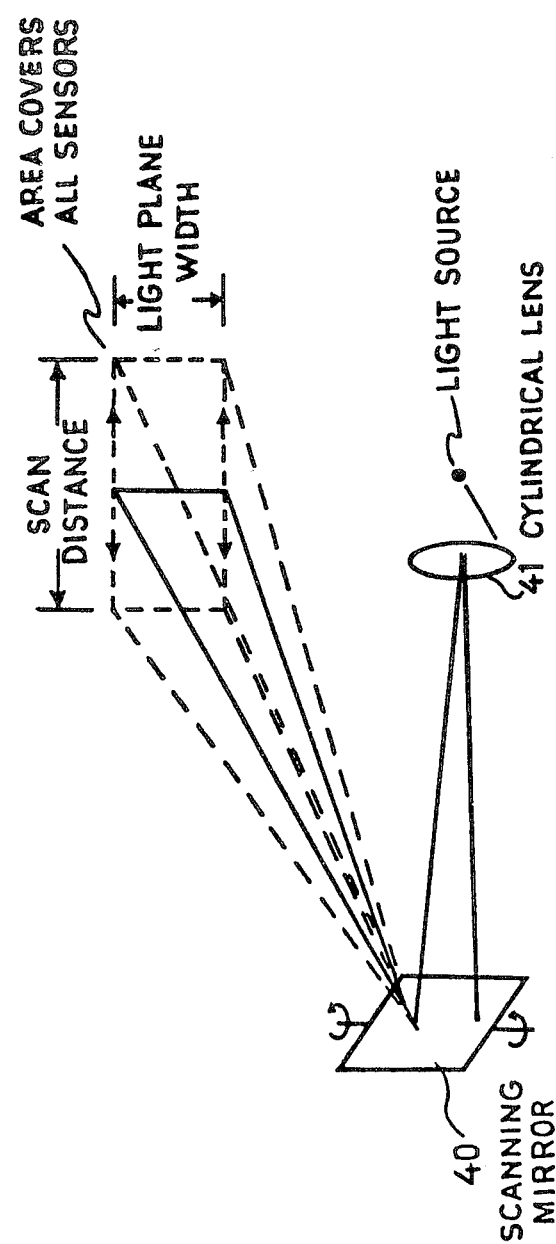
FIG. 4 is another diagrammatic view, showing a further embodiment.

Several alternative methods exist for implementing these projections. The plane projector can be implemented by optically generating a light plane, using cylindrical lenses 40 to collimate the rays from a light source. The thickness of a plane would be commensurate with the required resolution and the width sufficient to illuminate all sensors in one scan. As shown in FIG. 4, a rotating mirror system 41 will provide scanning orthogonal to the plane with the scan angle sufficient to illuminate all sensors. For that projector from which a projected line is required, 2 orthogonal light planes scanned as above can effect the same result. In this implementation, first one plane would be turned on and scanned across the field once. Then a second orthogonal plane would be turned on and scanned once across the field orthogonal to the first. Alternating the scans between the two planes produces two illumination pulses on each sensor 32. These two time marks uniquely locate the sensor along a single line emanating from the projector.

The scanning mechanism for all three light planes (two orthogonal planes from one projector and a single plane from the other) can be run continuously with the light planes sequentially turned on and off as orchestrated by the computer 21. Thus the illumination pulses from each sensor 32 can be attributed to a particular scanning plane. These nine pulse arrival times when correlated with the scan position time all three scanning planes and the servo-pointing data enable the computation of position and orientation of the platform 11 in space.

Alternative methods of implementing the plane/line projection pattern include a raster scan with a pencil light beam to implement a line projection directly; (any of the methods common to projection TV systems and the like are appropriate for this implementation); scanning of a plane by using a sequence of coded multi-plane projections as known from the prior art; and orthogonal coded patterns of the general type mentioned in the preceding sentence effecting a line projection in a manner similar to scanned sentence effecting a line projection in a manner similar to scanned orthogonal planes. In the use of coded patterns as described in the two preceding sentences, the computer processing must include the associated decoding logarithms to appropriately determine the specific planes on which the sensor lies.

A final embodiment involves the use of reflectors on the platform 11 and of one projector and one camera off the platform. Three non-colinear reflectors 50 are shown mounted to the platform 11. These are physically small diffuse reflectors colored so as to reflect one of the three prime colors (i.e. one red, one green, and one blue). These reflectors are illuminated by an off-platform plane projector 51, similar to the scanning plane or a coded multi-plane projector implementation described with respect to FIG. 3. In this case, the spectral characteristics of the projected light must be nearly white to achieve proper reflection from the three reflectors 50. Also mounted off platform is a color TV camera 52 to individually sense the reflected images of the three reflectors 50 and identify each reflector 50 by color.

Thus, each reflector 50 is identified and its position in space determined as the intersection of a line (defined by the camera image position) and a plane (defined by the plane projector). Both the projector 51 and camera 52 pointing positions 21 are servo-controlled (servos 22, 23) via the computer 21 to track the platform 11 as in FIGS. 1 and 2.

Figure 6:
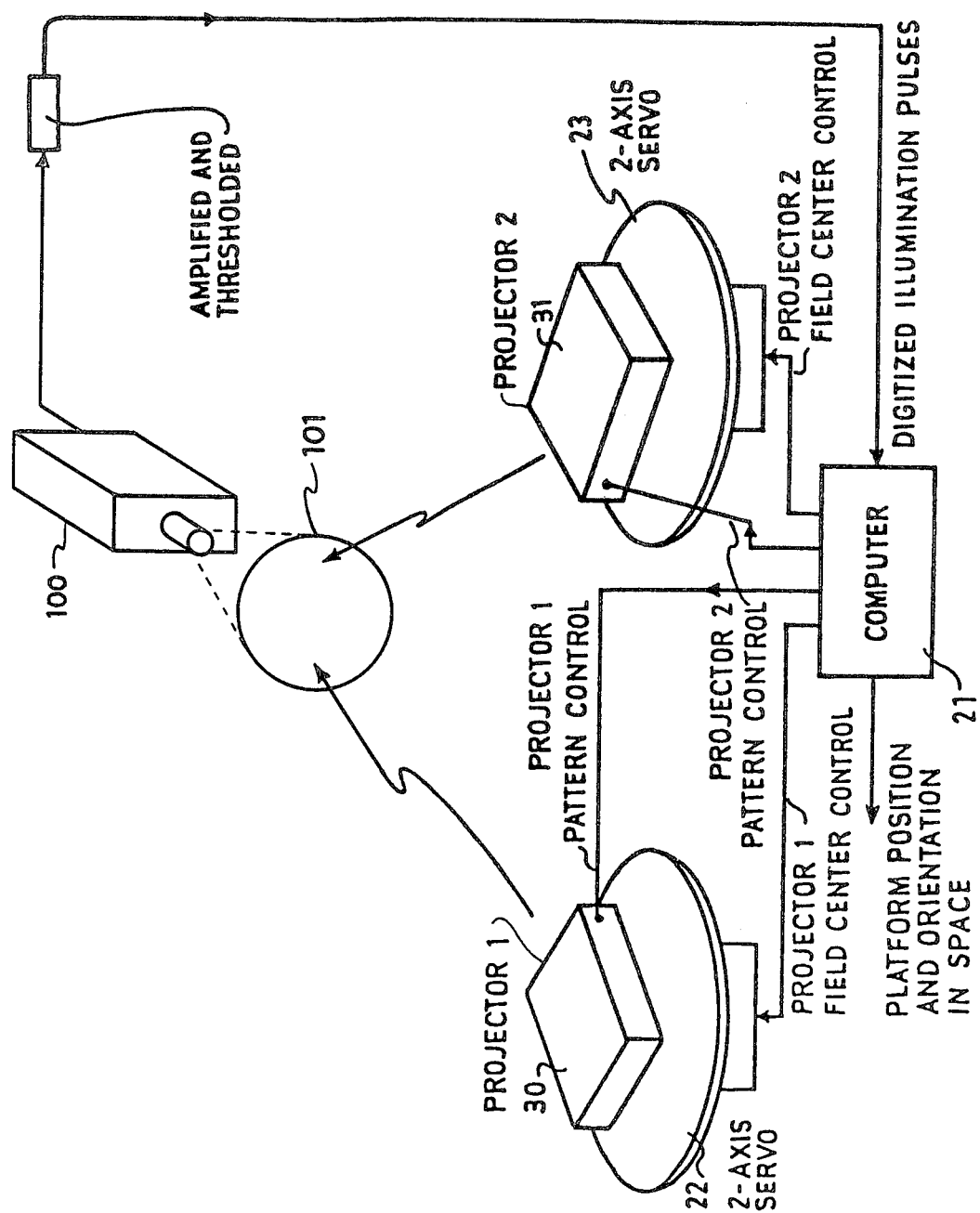
FIG. 6 is a diagrammatic illustration of use of a frosted glass disk and a TV camera in lieu of discrete photo cells as in FIG. 3.

FIG. 6 shows a method of tracking the position and orientation of a platform similar to the method of FIG. 3 which uses three discrete photo cells. In this embodiment of FIG. 6, projectors 30 and 31 project their patterns onto the etched glass disk 101. Either single planes and rays may be transmitted or multiple coded planes and rays may be transmitted by the projectors 30 and 31 onto the glass plate which is viewed by TV camera 100. Each point on the etched glass plate 101 is measured by a discrete picture element of the TV camera. The etched glass plate and camera are calibrated as in the prior art. Each point on the glass disk can be treated as one of the discrete photo cells in the method of FIG. 3. An advantage of the method of FIG. 6 is that there are thousands (multiple planes and rays) or hundreds (single ray and plane) of measurements which allows for statistical processing and thus obtain greater accuracy which is necessary for many applications. A difficulty or disadvantage of this method is that the TV camera lens and glass plate must be carried by the platform or robot arm.

Figure 7:
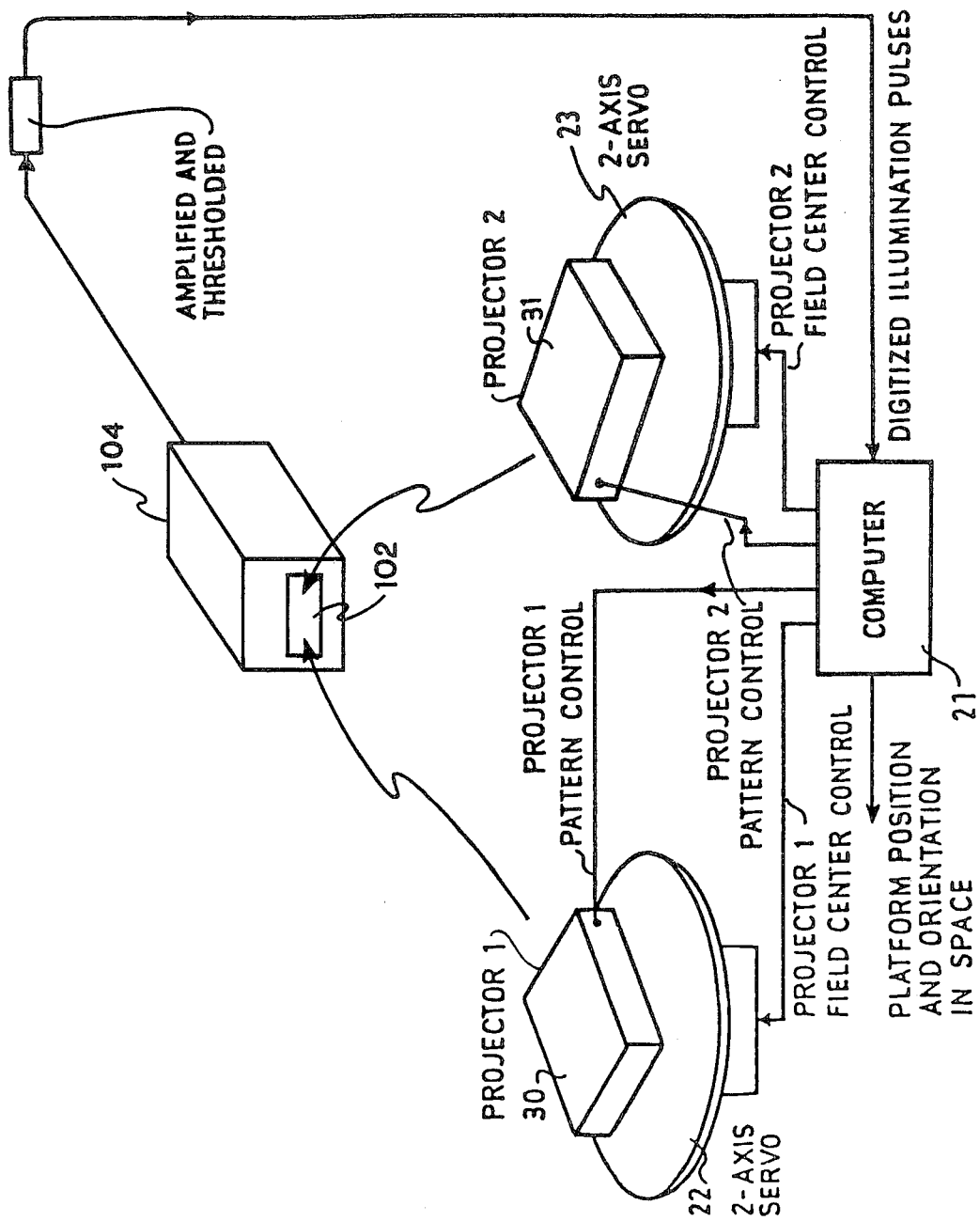
FIG. 7 is similar to FIG. 6, but the lens and frosted glass disk are replaced by allowing the projected patterns to impinge directly onto the TV sensor surface.

FIG. 7 shows a method similar to the method of FIG. 6, but the etched glass plate and camera lens have been eliminated. That platform or robot arm has thereby less bulk to carry. Several solid state TV cameras without a lens are available and are quite small. It is possible to separate the solid state TV chip 102 with a small amount of circuitry and mount it on the platform or robot arm and house the rest of the camera 108 elsewhere.

Figure 8:
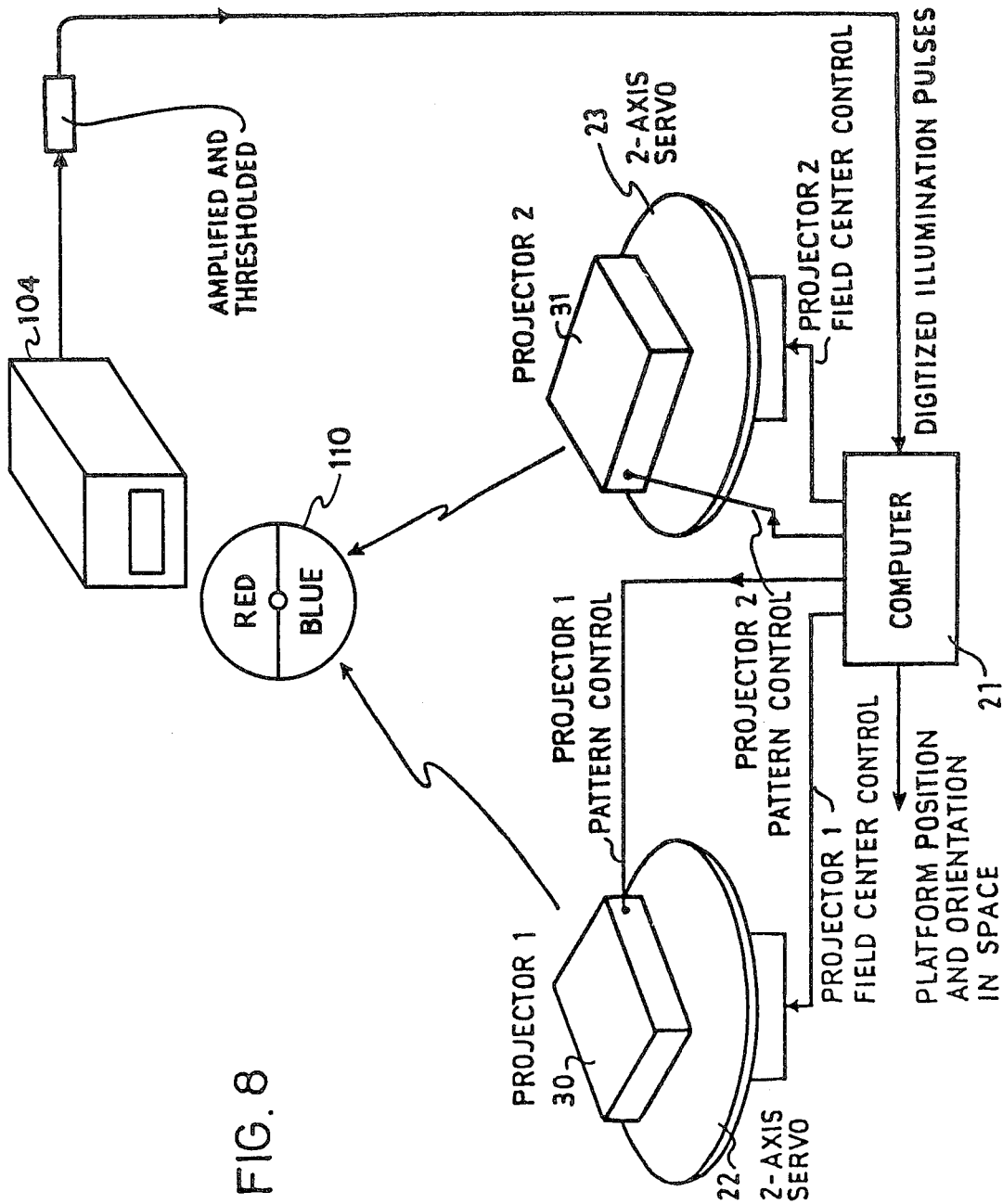

FIG. 8 shows the same method as FIG. 7 but with the addition of a color wheel 110 to allow simultaneous transmissions of projector codes (i.e., horizontal and vertical). If only one projector was to transmit in color, a better place to mount the color filter wheel would be on the platform of the projector and save bulk and weight on the measurement platform.

Figure 5:
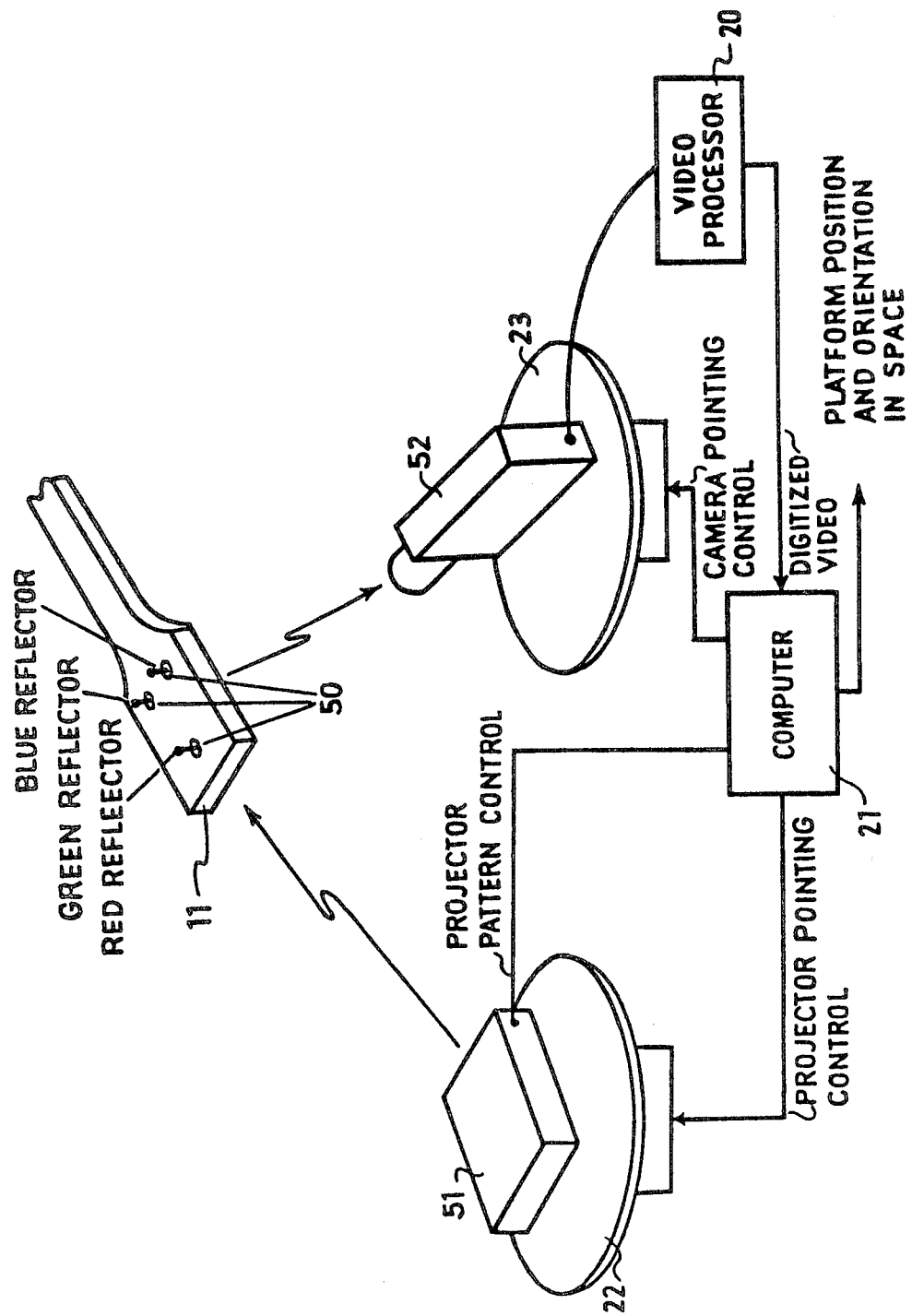
FIG. 5 is a further diagrammatic view of yet another embodiment of the invention.
Figure 9:
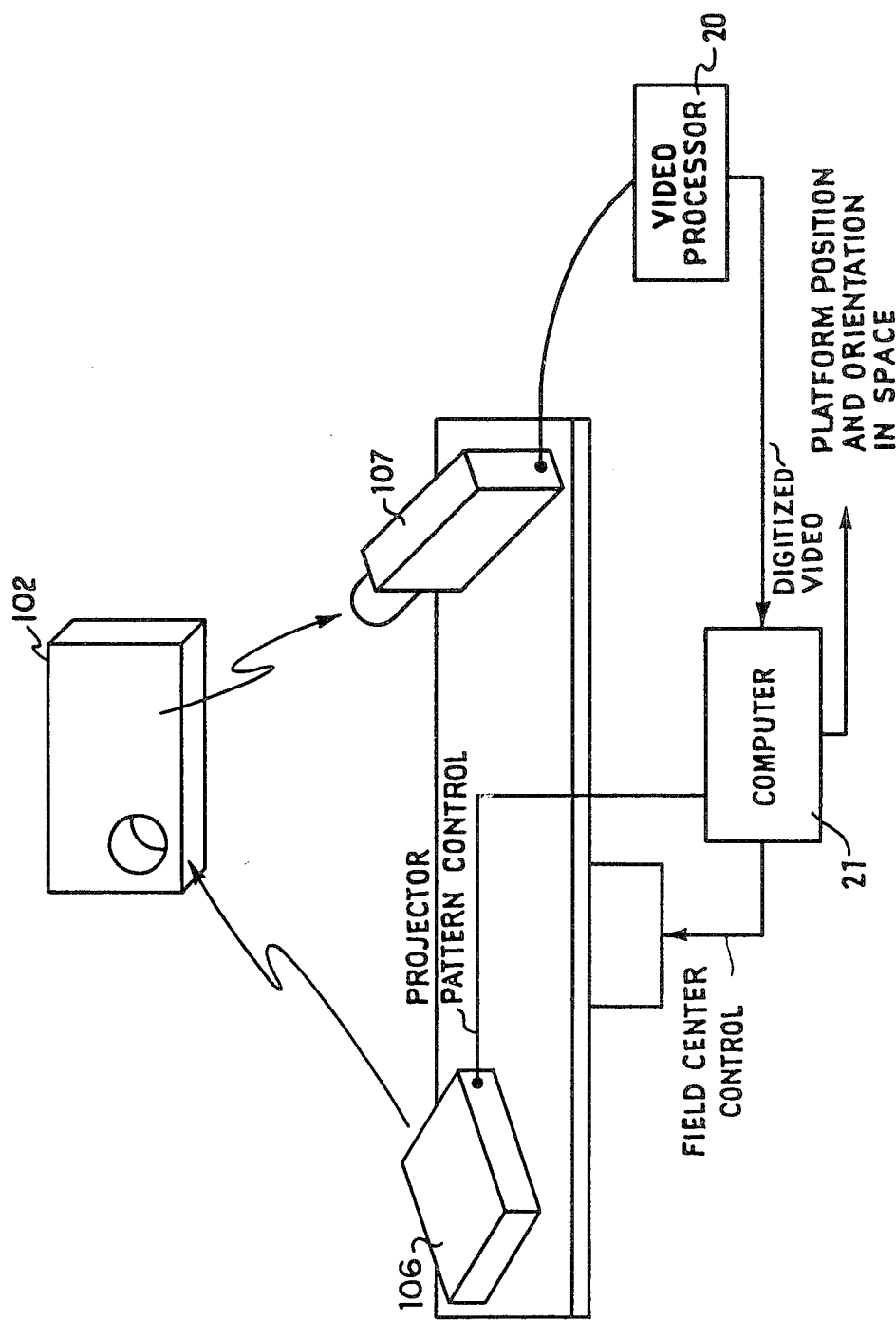
FIG. 9 is similar to the method of FIG. 5, but uses 3-D shape in lieu of color.

FIG. 9 shows a method of tracking the position and orientation of a platform or robot arm similar to the method of FIG. 5 which uses three discrete colored reflectors. This method measures a known-shaped object 102 in the three dimensional method of the prior art or a two dimension and three dimensional method permitted by prior knowledge of the shape being measured. The advantage of this method over the method of FIG. 5 is that more measurements are taken and thus statistical processing can be used for greater accuracy. A disadvantage of this method compared to the method of FIG. 5 is that much more processing is required. Another advantage of this method is that color is not required. Projector 106 and camera 107 are mounted and calibrated on a platform. This platform combination comprises a three-dimensional sensor as already known in the art.

Figure 10:
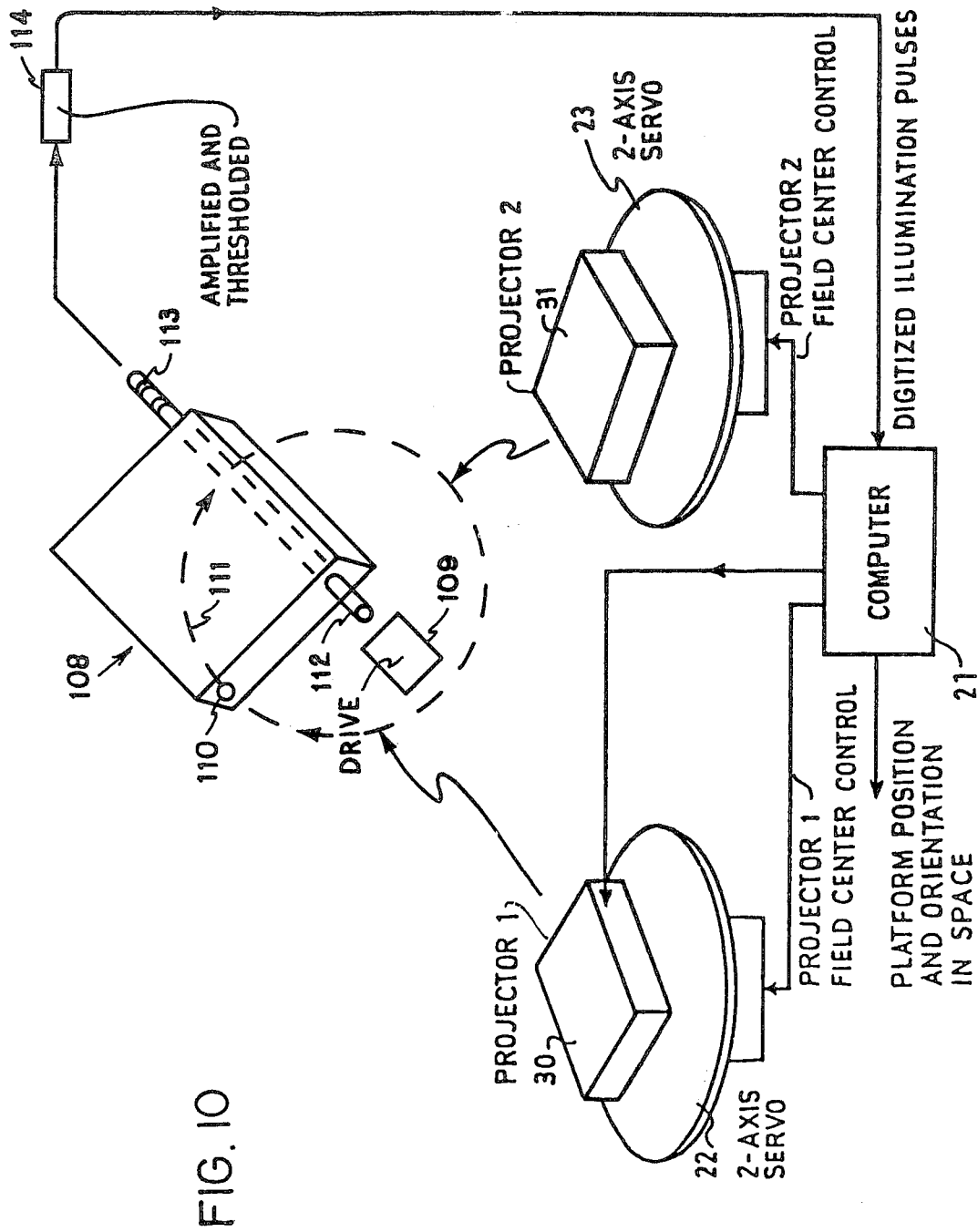
FIG. 10 is a compromise between the method of FIG. 3, which uses three discreet photo detectors and the method of FIG. 7, which uses a TV camera.

FIG. 10 is a compromise between the method of FIG. 3, which uses three discrete photo detectors, and the method of FIG. 7 which uses a TV camera. The main advantage of this system is cost compared to a TV camera. The rotating detector 108 cuts through the projected planes as in the methods of FIG. 3 and FIG. 7. The rotation is produced by drive 109. Disadvantages of this method are that moving parts are required and the system is somewhat bulky to mount on the measurement platform and robot arm.

The rotating detector 108 has a photocell or fiber optic tip 110, which take the path 111 when shaft 112 rotates. The signs from element 110 are transmitted from brushes 113; for example, which supply the signals to an amplifier in the well-known manner for use by a computer.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method of sensing the positional orientation of elements in space, comprising the steps of: providing a plurality of light sensors on an element which is movable in space; said element comprising a transparent plate having patterns projected thereon; providing a pair of light projectors at positions spaced from said element; directing light beams from said projectors at said light sensors; modulating the angular position of said light beams over time; and correlating the time of illumination of each sensor with the position of the projected beam at the time of such illumination, so as to determine the angular position of each sensor with respect to each of said projectors.

2. A method of sensing the positional orientation of elements in space, comprising the steps of: providing a plurality of light sensors on an element which is movable in space; said light sensors comprising solid state TV chip means; providing a pair of light projectors at positions spaced from said element; directing light beams from said projectors at said light sensors; modulating the angular position of said light beams over time; and correlating the time of illumination of each sensor with the position of the projected beam at the time of such illumination, so as to determine the angular position of each sensor with respect to each of said projectors.

3. A method as defined in claim 2, and rotating a color wheel for simultaneous transmission of projector codes.

4. A method of sensing the positional orientation of elements in space, comprising the steps of: providing a plurality of light sensors on an element which is movable in space; said light sensors comprising an object having a predetermined shape; providing a pair of light projectors at positions spaced from said element; directing light beams from said projectors at said light sensors; modulating the angular position of said light beams over time; and correlating the time of illumination of each sensor with the position of the projected beam at the time of such illumination, so as to determine the angular position of each sensor with respect to each of said projectors.

5. A method of sensing the positional orientation of elements in space, comprising the steps of: providing a plurality of light sensors on an element which is movable in space; said light sensors comprising rotating light detector means; providing a pair of light projectors at positions spaced from said element; directing light beams from said projectors at said light sensors; modulating the angular position of said light beams over time; and correlating the time of illumination of each sensor with the position of the projected beam at the time of such illumination, so as to determine the angular position of each sensor with respect to each of said projectors.

* * * * *